ent Office 3,518,328
Patented June 30, 1970

3,518,328
PROCESS FOR PREPARING MICROSPHERES OF URANIUM, PLUTONIUM OR THORIUM CARBIDE
Leonard V. Triggiani, Hyattsville, Md., assignor to W. R. Grace & Co., New York, N.Y., a corporation of Connecticut
No Drawing. Filed Mar. 21, 1967, Ser. No. 624,708
Int. Cl. G21c 21/00
U.S. Cl. 264—.5                          7 Claims

ABSTRACT OF THE DISCLOSURE

A method of preparing actinide carbide microspheres by co-precipitating a solution of the actinide metal and an alkaline dispersion of carbon, followed by peptization thereby forming an actinide oxide sol containing carbon. The sol is then formed into droplets and the droplets gelled by passing through a solvent column. The gelled droplets are washed and sintered to densify into the desired carbide composition.

---

This invention relates to a method of preparing spherical actinide carbide particles of controlled size. In one particular embodiment, it relates to the preparation of dense spheres of uranium carbide and other actinide carbides, by forming carbon-containing actinide oxide aquasols into spheres, which can then be sintered to dense actinide carbide spheres.

In recent years there has been an increased interest in the actinide metal carbides in the field of nuclear fuel development, especially in the form of small particles or irregular granules. The fabrication of these carbide particles from refractory carbide powders requires compacting or pelleting, followed by prolonged sintering at extreme temperatures. These particles are usually cladded. The protective cladding necessarily covers the particles completely, aids in preservation of the fuel at high temperatures and also aids in the retention of fission products.

It is clear that presently the preferred form for actinide carbides is a smooth, small, dense sphere with an impervious coating. Generally, the term "microsphere" will be used hereafter to designate the desired particle.

The present methods for the preparation of microspheres are laborious, costly, and result in a low yield of products. From a practical standpoint, they have limited effectiveness. The microsphere product itself, which results from the present methods of preparation, suffers from lack of sphericity and uniform structure and frequently exhibits surface irregularities.

The principal difficulties encountered are technical and economic ones that arise from the moisture and air sensitivity of the refractory carbide powders. Carbide powders have to be compacted before sintering to high densities. The powder method used to prepare these carbide microspheres consists of crushing and grinding the carbide powder, to the desired size range, bringing the particles to a general spherical size and shape by abrasion techniques and sintering to high density. The material must be sized and recycled at the various stages. The yield in each of the different steps is very low, due to generation of actinide fines during processing. These procedures are also generally unsatisfactory with the very air and moisture sensitive materials. In addition, the very high melting points of the carbides make the use of molten materials very difficult.

I have found that carbon-containing actinide oxide sols can be used in the preparation of carbide microspheres for eventual use in nuclear fuel elements. The use of these oxid-carbon sols permits relatively simple direct processes for obtaining smooth spherical shapes in narrow controllable size ranges. Milder conditions of temperature and time are required for conversion to dense carbides. The uniform microstructure and reactivity of the dried colloidal constituents contributes both to carbide formation, densification and the properties of the resulting spheres. In addition, a wide range of oxide sols are available for use in preparing the carbide microspheres.

In summary, my invention comprises feeding an aqueous actinide aquasol consisting of carbon-containing actinide oxide particles prepared by mixing an actinide salt solution into an alkaline dispersion of colloidal-sized carbon into a solvent column which forms the sol into small microspheres.

The aquasol preparation is more fully described as follows:

A solution of the actinide is blended with an alkaline dispersion of colloidal carbon whereby the actinide is precipitated with the carbon by the alkali present. The resulting precipitate is then peptized, and formed into the sol.

This technique utilizes an alkaline dispersion of carbon which can be prepared easily using standard techniques or may be purchased commercially.

Although I do not wish to be bound by theory, it is my belief that a superior carbide microsphere composition is obtained using my inventive technique because the actinide oxide particles coalesce around the colloidal carbon particles. The resultant particles exhibit the surface characteristics of the pure oxide aquasol particles. Since the microsphere formation in the column is effectively a surface-dependent characteristic of the sol, the technology in the column treatment is that of the pure actinide aquasols.

My novel method of carbide sphere production results in an oxide-carbon microsphere capable of being sintered to form dense carbide microspheres. The microsphere is not air and moisture sensitive until after the final process step, when conversion to carbide is complete.

The carbide microspheres can be prepared using any soluble actinide salt. Since uranium is the preferred actinide, the preferred salt is uranous chloride, although certain hexavalent uranium compounds, e.g., uranyl chloride, can be used. However, the hexavalent uranium is reduced just before adding to the alkaline carbon dispersion. A general procedure for this reduction may be found in U.S. Pat. 3,189,555, although other methods will occur to those skilled in the art.

The invention is also particularly applicable to the use of thorium, uranium, plutonium, and mixtures thereof. In addition, these actinide oxides may be mixed with oxides of zirconium, hafnium, yttrium, and members of the lanthanide series of elements beginning with element No. 58 through No. 71 of the Periodic Table.

The carbon content of the sol is about 1–40 weight percent. However, some of the carbon is lost during the sintering process, so that the finished microspheres contain about 5–20 weight percent carbon.

It is noted that maximum values in the range of 5–20 weight percent carbon in a uranium carbide microsphere, correspond to a tetracarbide composition. Since the monocarbide and the dicarbide are the only stoichiometrically permissible forms, it is clear that excess free carbon can be present in the finished sphere.

In further references to the amount of carbon present, it will be clear that 20 weight percent carbon corresponds to C to U ratio of about 4. The C to U ratio in the pure monocarbide is 1, and in the pure dicarbide is 2.

The sintered microsphere product as described above, can be uranium monocarbide, uranium dicarbide, can contain excess carbon to an amount corresponding to a tetracarbide, and can be mixtures thereof. The exact composition of the microsphere can be generally predicted in advance, as it is dependent on the amount of carbon present in the original sol. During the sintering step, when the oxygen in the uranium oxide is being replaced by carbon, the monocarbide is first formed, and then excess carbon reacts to form the dicarbide or higher carbides. It is clear that monocarbide and higher carbides are actually being formed simultaneously, and very close control of the amount of carbon and the sintering process must be maintained to result in production of a final microsphere having pure monocarbide or dicarbide composition. My invention process can be used to produce the actinide carbides containing up to 20 weight percent carbon, as previously stated.

The first step in the process of my application comprises the preparation of oxide-carbon sols.

This process first involves the preparation of an alkaline dispersion in which fine-sized carbon is dispersed in an aqueous solution of ammonia or an ammonia-producing agent. Many ammonia-producing agents are suitable and the following are preferred: urea, hexamethylenetetramine, acetamide, ammonium carbamate, and ammonium cyanate.

The alkaline carbon dispersion can be conveniently prepared using an ultra-sonic probe. However, the dispersion can also be prepared using grinding techniques or a commercially available blending device; a suitable dispersion is also available commercially.

An actinide salt solution is then slowly added to the aqueous alkaline carbon dispersion, which has been freshly dispersed. An actinide precipitate containing carbon is obtained; when the actinide is uranium, an electron micrograph of this precipitate has shown a dense urania coating around a carbon core, with particles of about 20 mu diameter. This precipitate is then peptized by the addition of small quantities of acid. Any mono-hydrogen acid may be used, which will reduce the pH of the slurried precipitate to about between 3–4. The preferred acid is nitric acid. Since the amount of acid used to peptize the oxide depends on the amount of electrolyte still present at the point of peptization, the best criterion for deciding the amount of acid to be used is based upon pH. The peptization is generally carried out at an elevated temperatuer of about 40 to 100° C. for at least one hour. After peptization, the product is autoclaved to complete formation of the composite sol. The autoclaving is carried out by heating the components at a temperature of 100 to 200° C. for a period of 2 to 30 hours, preferably at a temperature of 120° C. for about 15 hours.

This composite sol is stable indefinitely, and does not appreciably settle or precipitate. The sol can be stored at this point and later used when convenient. This stability is quite remarkable and surprising, in light of the fact that actinide carbide sols prepared by mixing an actinide oxide sol with a carbon dispersion tend to agglomerate immediately. In fact, it is impossible to use this latter mixed sol to prepare homogeneous microspheres in the solvent column as hereinafter described.

In the next step in the process, the sol is spheroidized in a solvent column. The sol is injected into the top of the column through submerged needles or a related droplet sizing device. Droplets form due to surface tension, and fall through the solvent, gelling as they fall, and are collected in the bottom column cone. They can be continuously withdrawn from the cone by suction through a tube or collection section of the column, separated from the solvent and dried prior to sintering to high density.

The solvent giving the best results in this system must be inert, substantially water immiscible, free of objectionable physical properties, such as emulsifying tendencies, for example, and must have a density low enough to permit settling, preferably a density below one. Examples of suitable solvents include ethyl hexanol, hexanol, butanol, the higher alcohols, benzene, toluene, and others.

The solvent can have a capacity for water, so that the spheres are dehydrated as they fall through the solvent, as more fully described in U.S. Ser. No. 541,519, filed, Apr. 11, 1966, now Pat. 3,331,785, dated July 18, 1967.

The solvent can be circulating or stationary in the column. The above-identified applications provide references to equipment and apparatus set-ups to produce a wide range of sphere-forming and drying or gelling conditions. Equipment dimensions can be designed to be within critical limits for handling enriched materials. One suitable column for this process is 7 feet long and 3 inches in diameter, with a conical bottom to collect the settled spheres.

This invention is further illustrated by the following specific but non-limiting examples.

EXAMPLE 1

A uranous chloride solution containing 7.77 weight percent uranium having a density of 1.14 grams per cc. was prepared from a uranic oxychloride ($UO_2Cl_2$) solution by reduction with uranium metal. 500 cc. of this solution was added with vigorous agitation to an alkaline dispersion of carbon. The carbon dispersion was a commercially available product having 22 weight percent carbon. 43.5 g. of the commercial carbon dispersion was diluted before addition of the uranous chloride solution with 400 cc. of water and 250 cc. of concentrated ammonium hydroxide. The time of addition was about 1 hour. At the end of this time, a dark precipitate had collected in the bottom of the reaction vessel.

This precipitate was then washed with dilute aqueous ammonia and water, and slurried in a small amount of water. Nitric acid was added to a pH of 3.4, and the slurry was peptized for 1.5 hours at 100° C. The resultant sol was a urania coated carbon sphere, having a theoretical C/U mole ratio of 5.57. The final pH of the sol was corrected to a value of 3.8 by addition of a small amount of hexamethylene tetramine.

This $UO_2$ sol was then dried into microspheres using a technique which involved settling sol droplets through a counter flow column of hot butanol of controlled temperature and water content.

The equipment used was a column 7 feet long and 3 inches in diameter equipped with a conical bottom for collecting the dried spheres which settle through the solvent mixture.

The sol was injected centrally at the top of the column through a submerged No. 23 hypodermic needle. The spheres settled and were collected in the cone at the bottom of the column. The dried spheres were continuously removed from the cone bottom through a ⅛ inch Teflon tube by suction and separated in a trap from the solvent.

The column was operated at an inlet temperature of 90° C. and an outlet temperature of 63° C. The solvent flow was 700 cc. per minute. The water content in the column was to 22 weight percent and a water spray injection used at a rate of 14 cc. per minute at a distance of 65 inches from the top of the column. The products were perfect spheres with a dull, uniform surface. The analysis of the green microspheres showed a C/U ratio of 3.70.

The spheres retained their physical form on sintering at low pressures and temperatures between 500–1800° C. The exact procedure used was as follows: after drying, the spheres were treated in hydrogen with one hour required to reach 500° C.; this temperature was maintained for 3 hours. The spheres were then switched on a vacuum, and the temperature was raised over a one-half hour period to 1150° C. and held for 3 hours. At the end of 3 hours, the pressure was $5 \times 10^{-5}$ mm. Hg. The temperature was raised over 15 minutes to 1350° C., with the rate such that the pressure did not exceed $5 \times 10^{-4}$ mm. Hg. The temperature was then raised to 1400° C. and held for 1 hour to achieve a pressure of about $7 \times 10^{-6}$ mm. The final temperature, 1750° C. is achieved very rapidly and held for 3 hours. The ultimate vacuum achieved is in the $10^{-7}$ mm. range.

Although these sintering conditions were used in this example, general variations can be made in the processing of the different microsphere compositions. The exact temperature and true cycles are best determined for each composition. Generally, calculation of the sintering parameters can be made by one skilled in the art, if the first pretreatment step with hydrogen is not omitted. The following equations will illustrate this. When the green microspheres are recovered from the column, the composition can be represented as $UO_{2+x} \cdot nC \cdot yH_2O$, where $n$ is a known integer, calculated from the amount of carbon present in the sol; $x$ and $y$ are unknown quantities. As the spheres are first heated, the water is driven off as free $yH_2O$. Then, when the spheres are treated in hydrogen, the stoichiometric excess of oxygen is reduced:

$$UO_{2+x} \cdot nC + xH_2 \rightarrow UO_2 \cdot nC + xH_2O \uparrow$$

The composition of the microsphere can now be represented as $UO_2 \cdot nC$, which when sintered, will give the desired uranium carbide composition and also carbon monoxide gas.

Generally, the temperature range is between 300–700° C. for 2–5 hours in hydrogen for the pretreatment step; and up to about 1800° C. as a maximum temperature. Total sintering time, including pretreatment, is about 10–30 hours.

Densities approaching theoretical were obtained. After sintering as described, the product spheres had a density of 11.2. This compares with the theoretical density of the pure UC of 13.63 and pure $UC_2$ of 11.68. Analysis by X-ray of the product microsphere showed a mole ratio of $UC_2$ to UC of 52 to 48. Total carbon content of the sintered spheres was 7.2 weight percent.

EXAMPLE 2

The same general procedure of sol formation was followed as in Example 1, except that 50.3 g. of the commercial carbon dispersion, and 496.4 cc. of a 7.79 weight percent uranous chloride were admixed as described. After addition was complete, the mixture was refluxed for 1 hour. The theoretical C/U ratio of the sol was 6.4. After treatment in the butanol column as described in Example 1, the green microsphere showed a C/U ratio of 4.20.

After sintering the green microspheres, the $UC_2$ to UC ratio was 93.4 to 6.6 by X-ray analysis. Density of the sintered spheres was 10.5 g./cc. Total carbon content of the sintered spheres was 9.4 weight percent.

EXAMPLE 3

The same general procedure was followed as in Example 1, with the same amounts of carbon and uranous solution as in Example 2. The pH of the sol before column reaction was adjusted to 3.8. Analysis of the green sphere showed a C/U ratio of 4.17. After sintering, density was 10.23 and a $UC_2/UC$ ratio of 93.6 to 6.4 was measured using X-ray techniques. Total carbon content was 9.7 weight percent.

EXAMPLES 4–8

Using the same general procedures described in Examples 1–3, the following sintered microsphere compositions were obtained as described in Table I.

TABLE I

| Example | Sol C/U ratio | Green sphere C/U ratio | Sintered sphere total C, weight percent | Sintered sphere $UC^2/UC$ ratio [1] |
|---|---|---|---|---|
| 4 | 3.95 | 4.1 | 8.8 | 90.4/7.1 |
| 5 | 4.28 | 4.3 | 9.4 | 91.2/7.5 |
| 6 | 4.2 | 4.3 | 9.7 | 89.7/6.3 |
| 7 | 4.5 | 4.5 | 10.37 | 92.4/5.1 |
| 8 | 4.7 | 4.7 | 12.37 | 90.4/4.7 |
| 9 | 4.9 | 4.9 | 13.19 | 94.2/3.4 |

[1] The difference between the sum of the weights of $UC^2$ and UC present and 100 is the weight of free carbon present in the sintered microsphere.

Having fully described my invention, what is claimed is:

1. A process for preparing spherical uranium, plutonium or thorium carbide microspheres which comprises:
   (a) mixing an aqueous dispersion of colloidal carbon with an alkaline solution of ammonia or an ammonia producing agent to prepare an alkaline carbon dispersion,
   (b) adding an aqueous actinide salt solution of uranium, plutonium or thorium to said alkaline carbon dispersion to prepare aqueous carbon actinide precipitate,
   (c) recovering the precipitate,
   (d) peptizing the precipitate by adjusting the pH to about 3–4 with a monohydrogen acid to prepare a carbon actinide aquasol,
   (e) injecting said aquasol into the top of a solvent column through a droplet sizing device wherein sol droplets form as they fall due to surface tension,
   (f) passing the formed aquasol droplets through a solvent-containing column wherein said droplets gel into microspheres,
   (g) washing the gelled microspheres, and
   (h) sintering the recovered gel microspheres to densify them into the desired carbide composition.

2. The process of claim 1 wherein the solvent is inert, substantially water immiscible and of low density.

3. The process of claim 2 wherein the solvent is ethyl hexanol, hexanol, butanol, benzene or toluene.

4. The process of claim 1 in which the sintered uranium, plutonium or thorium carbide microspheres contain 5–20% by weight carbon.

5. The process of claim 1 in which the ammonia-producing agent is chosen from the group consisting of urea, hexamethylenetetramine, acetamide, ammonium carbonate and ammonium cyanate.

6. The process of claim 1 in which the sintering step comprises pretreatment in hydrogen in the temperature range of 300° C. to 700° C. followed by high temperature treatment in a vacuum in the temperature range of 500° C. to 1800° C.

7. The process according to claim 1 wherein the uranium, plutonium or thorium oxide is mixed with oxides of zirconium, hafnium, yttrium, or members of the lanthanide series of elements beginning with element No. 58 through No. 71 of the Periodic Table.

References Cited

UNITED STATES PATENTS

| | | | |
|---|---|---|---|
| 3,171,715 | 3/1965 | Kleinsteuber | 252—301.1 X |
| 3,171,815 | 3/1965 | Kelly et al. | 252—301.1 |
| 3,264,224 | 8/1966 | Fitch et al. | 252—301.1 |
| 3,301,790 | 1/1967 | Fitch et al. | 252—301.1 |
| 3,312,631 | 4/1967 | Smith | 252—301.1 |
| 3,312,632 | 4/1967 | Smith | 252—301.1 |
| 3,331,783 | 7/1967 | Braun et al. | 252—301.1 |
| 3,345,437 | 10/1967 | Flack et al. | 264—.5 |
| 3,384,687 | 5/1968 | Flack et al. | 264—.5 |

REUBEN EPSTEIN, Primary Examiner

U.S. Cl. X.R.

23—343, 344, 345, 349; 252—301.1